(12) United States Patent
Missotten et al.

(10) Patent No.: US 10,412,893 B2
(45) Date of Patent: Sep. 17, 2019

(54) HARVESTING METHOD USING UNMANNED AGRICULTURAL WORK VEHICLES

(71) Applicant: CNH Industrial America LLC, New Holland, PA (US)

(72) Inventors: Bart M. A. Missotten, Herent (BE); Christopher A. Foster, Mohnton, PA (US); Neseth Cora Kong, Lancaster, PA (US); John H. Posselius, Ephrata, PA (US); Frederik Tallir, Esen (BE); Karel M. C. Viaene, Moorslede (BE)

(73) Assignee: CNH Industrial America LLC, New Holland, PA (US)

( * ) Notice: Subject to any disclaimer, the term of this patent is extended or adjusted under 35 U.S.C. 154(b) by 238 days.

(21) Appl. No.: 15/308,561

(22) PCT Filed: May 5, 2015

(86) PCT No.: PCT/EP2015/059833
§ 371 (c)(1),
(2) Date: Nov. 2, 2016

(87) PCT Pub. No.: WO2015/173073
PCT Pub. Date: Nov. 19, 2015

(65) Prior Publication Data
US 2017/0055455 A1 Mar. 2, 2017

(30) Foreign Application Priority Data
May 15, 2014 (BE) .................................. 2014/0364

(51) Int. Cl.
*G05D 1/02* (2006.01)
*A01B 69/00* (2006.01)
*A01D 90/10* (2006.01)

(52) U.S. Cl.
CPC ............. *A01D 90/10* (2013.01); *A01B 69/007* (2013.01); *G05D 1/0291* (2013.01); *G05D 2201/0201* (2013.01)

(58) Field of Classification Search
CPC .... A01D 90/10; A01B 69/007; G05D 1/0291; G05D 2201/0201
See application file for complete search history.

(56) References Cited

U.S. PATENT DOCUMENTS

| 4,104,850 | A | 8/1978 | Harris |
| 7,277,784 | B2 | 10/2007 | Weiss |

(Continued)

*Primary Examiner* — Saul Rodriguez
*Assistant Examiner* — Ashley K Romano
(74) *Attorney, Agent, or Firm* — Peter K. Zacharias; Patrick M. Sheldrake

(57) ABSTRACT

The present invention is related to a method for harvesting crops from a field and to a method for working a field by towing an apparatus such as a tilling apparatus, wherein the methods of the invention employ manned and unmanned vehicles. The operation and movement of the unmanned vehicles is controlled by the drivers of the manned vehicles which are continuously in the vicinity of the unmanned vehicles. The harvesting method involves at least the driver of a harvesting vehicle such as a combine harvester and the driver of a crop collecting vehicle such as a truck, wherein the drivers control the operation of one or more unmanned crop carts, operated to receive harvested crops from the harvesting vehicle during a harvesting phase and deliver harvested crop to the crop collecting vehicle during a subsequent delivery phase The control effected by the driver of the harvesting vehicle and the driver of the collecting vehicle is such that each driver is capable of visually inspecting the crop cart's operation during the totality of the harvesting and delivery phases respectively. The invention is equally related to a method for working an agricultural field wherein an agricultural apparatus, such as a tillage appara- (Continued)

tus, is towed through the field, by one or more unmanned vehicles, while the operation of the unmanned vehicles is controlled by the operator of a manned vehicle that is moving along with the unmanned vehicles through the field.

10 Claims, 3 Drawing Sheets

(56) References Cited

U.S. PATENT DOCUMENTS

| | | | |
|---|---|---|---|
| 8,126,620 B2 | 2/2012 | Ringwald et al. | |
| 8,285,456 B2 * | 10/2012 | Jensen | G05D 1/0011 |
| | | | 180/14.1 |
| 8,451,139 B2 * | 5/2013 | Morselli | A01B 69/008 |
| | | | 340/901 |
| 8,544,574 B2 | 10/2013 | Egley et al. | |
| 8,548,649 B2 * | 10/2013 | Guyette | A01B 79/005 |
| | | | 111/170 |
| 8,602,135 B2 | 12/2013 | Kraus | |
| 8,626,406 B2 * | 1/2014 | Schleicher | A01D 41/1278 |
| | | | 701/24 |
| 8,649,930 B2 * | 2/2014 | Reeve | A01B 69/008 |
| | | | 701/23 |
| 8,789,563 B2 * | 7/2014 | Wenzel | A01F 25/14 |
| | | | 141/114 |
| 9,185,845 B2 * | 11/2015 | Van Mill | A01D 41/127 |
| 9,187,259 B2 * | 11/2015 | Van Mill | B65G 43/00 |
| 9,272,853 B2 * | 3/2016 | Van Mill | B65G 67/04 |
| 9,605,409 B2 * | 3/2017 | Gudat | E02F 9/2045 |
| 9,642,305 B2 * | 5/2017 | Nykamp | A01D 43/087 |
| 9,675,008 B1 * | 6/2017 | Rusciolelli | A01D 90/10 |
| 9,861,040 B2 * | 1/2018 | Bonefas | A01D 43/073 |
| 9,915,952 B2 * | 3/2018 | Dollinger | A01B 69/008 |
| 2004/0151565 A1 | 8/2004 | Zaun et al. | |
| 2013/0045067 A1 | 2/2013 | Pickett et al. | |

* cited by examiner

HARVESTING METHOD USING UNMANNED AGRICULTURAL WORK VEHICLES

CROSS REFERENCE TO RELATED APPLICATION

This application is the National Stage of International Application No. PCT/EP2015/059833 filed May 5, 2015, which claims priority to Belgian Application No. 2014/0364 filed May 15, 2014, the contents of which are incorporated herein by reference.

FIELD OF THE INVENTION

The present invention is related to harvesting methods involving manned work vehicles such as combine or forage harvesters for gathering and processing crop material from a field. The invention is in particular related to methods wherein such vehicles are used in combination with unmanned work vehicles.

STATE OF THE ART

Due to the increasing weight and power of agricultural work vehicles, in particular of combine harvesters, present day designs of these types of vehicles are approaching a limit of what is an acceptable size of the vehicle. Especially combine harvesters equipped with a storage tank have become so large as to be impracticable in the field. Tractors have also become more powerful, including designs that are equipped with 4 tracks for large scale tillage operations. All of these designs are complex and expensive but the ever increasing productivity demands leave little space for alternative solutions.

The use of unmanned vehicles in agriculture has been explored in the past, and a number of designs and ideas in this area are known, as illustrated for example by documents US-A-20060150584, WO-A-03028433 or EP-A-2548429. Such vehicles are operable as grain carts that can be steered via a wireless or physical link by an operator. In terms of the practical organisation of a harvesting operation however, the applicability of these vehicles has not been sufficiently investigated. For example, when an unmanned grain cart is full, its movement towards a truck or a larger tractor-pulled grain cart is supposed to take place by wireless steering from a distance. During such an operation however, no visual control over the vehicle can be executed by the person who is steering the vehicle, or at least some moments may occur during which such visual control is not possible. These situations may cause safety problems as well as forming a potential source of liability issues when accidents occur.

SUMMARY OF THE INVENTION

The present invention is related to a method for harvesting crops from an agricultural field as disclosed in the appended claims. The present invention is thus related to a method for harvesting crops from a field and to a method for working a field by towing an apparatus such as a tilling apparatus, wherein the methods of the invention employ manned and unmanned vehicles. The operation and movement of the unmanned vehicles is controlled by the drivers of the manned vehicles which are continuously in the vicinity of the unmanned vehicles. The harvesting method involves at least the driver of a harvesting vehicle such as a combine harvester and the driver of a crop collecting vehicle such as a truck, wherein the drivers control the operation of one or more unmanned crop carts, operated to receive harvested crops from the harvesting vehicle during a harvesting phase and deliver harvested crop to the crop collecting vehicle during a subsequent delivery phase The control effected by the driver of the harvesting vehicle and the driver of the collecting vehicle is such that each driver is capable of visually inspecting the crop cart's operation during the totality of the harvesting and delivery phases respectively. The invention is equally related to a method for working an agricultural field wherein an agricultural apparatus, such as a tillage apparatus, is towed through the field, by one or more unmanned vehicles, while the operation of the unmanned vehicles is controlled by the operator of a manned vehicle that is moving along with the unmanned vehicles through the field.

DETAILED DESCRIPTION OF THE PREFERRED EMBODIMENTS OF THE INVENTION

Figure 1:
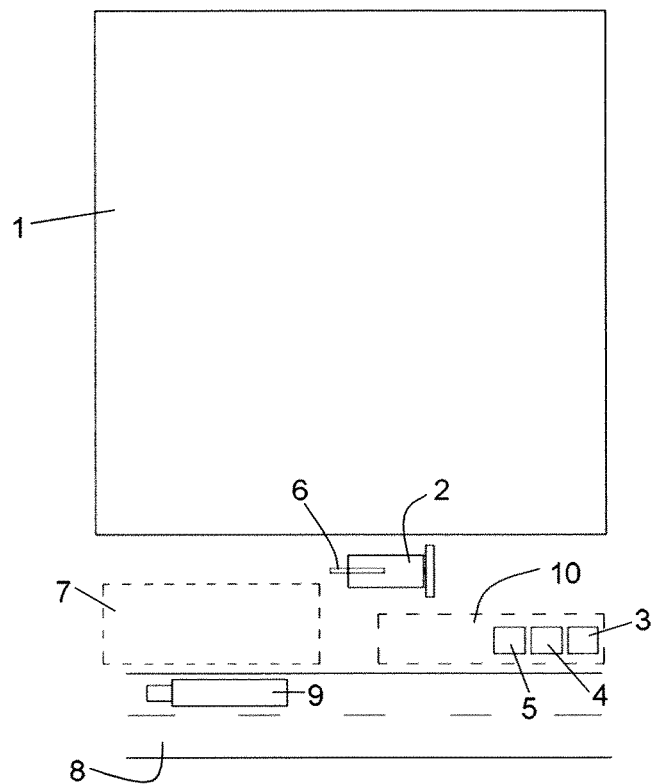
FIGS. 1 to 5 illustrate the steps of a harvesting method according to one embodiment of the invention.
Figure 2:
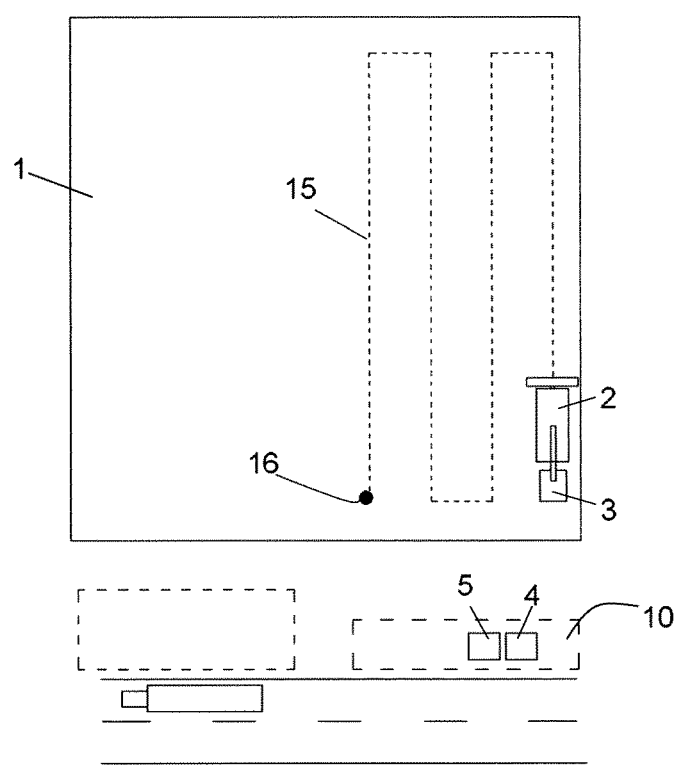
Figure 3:
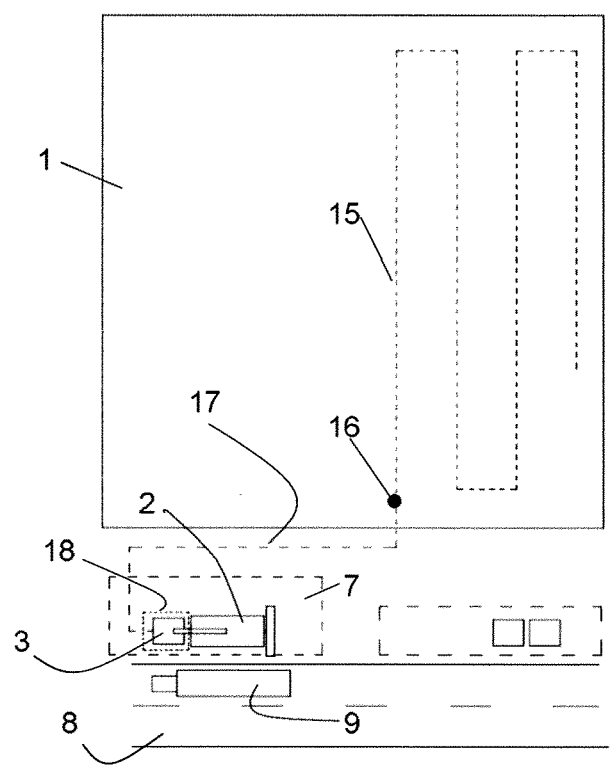
Figure 4:
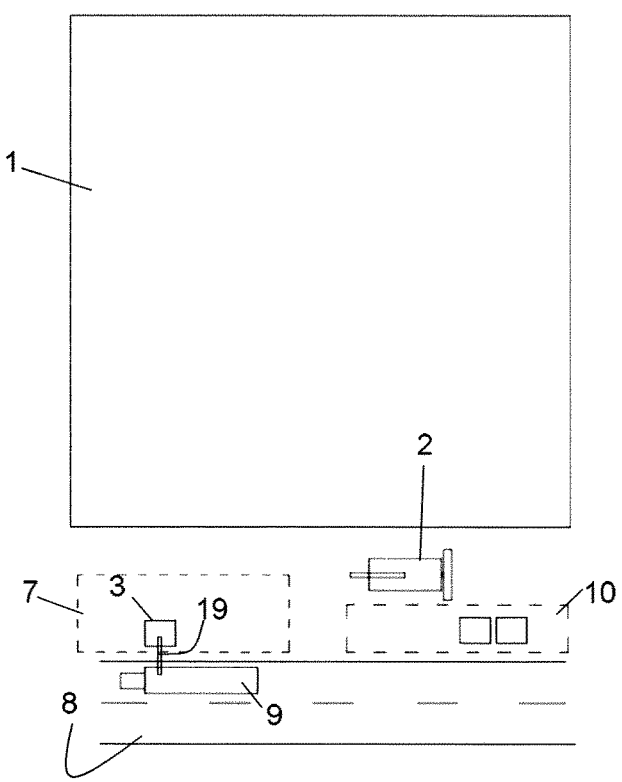
Figure 5:
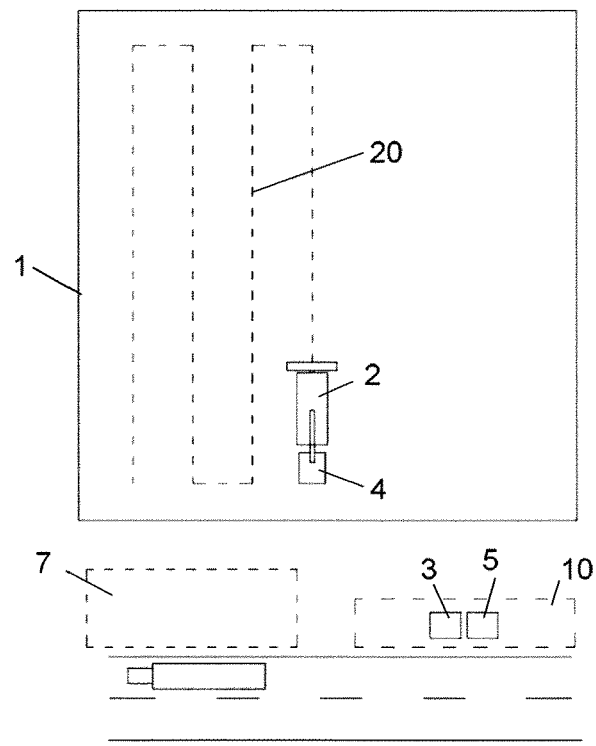

A preferred embodiment of the harvesting method of the invention will now be described with reference to FIGS. 1 to 5. The detailed description is not limiting the scope of the invention, which is defined only by the appended claims. FIG. 1 illustrates a field 1 of crops that need to be harvested by a combine harvester 2. The 'field' 1 is defined as the area covered by crops. At least to one side of the field are peripheral areas that are accessible to the combine harvester. A plurality of unmanned self-propelled grain carts 3, 4 and 5 are available to the driver of the combine 2. The combine is equipped with control means which allow the combine's driver to take control of an unmanned grain cart so that the grain cart's general operation and movements can be manipulated by the combine driver. In the field 1, the cart is driven alongside or behind the harvester as the latter is harvesting crops. Control over the grain carts is preferably executed through wireless communication between the combine and the grain cart. The transport of crops from the harvester to the grain cart takes place by any known means, preferably by a grain spout 6.

A grain collecting area 7 is located in close proximity to the field 1, and adjacent a road or path 8. A grain collecting vehicle, preferably a truck 9 can drive up and down the road or path 8 and thus alongside the grain collecting area 7. The field itself nor the peripheral area between the field 1 and the road 8, are accessible to the truck. The empty unmanned grain carts 3/4/5 are stationed in a grain cart parking area 10. FIG. 1 shows the combine 2 at the start of the operation of harvesting the field 1 according to the method of the invention. This operation is hereafter described in a number of method steps.

In step 1 of the method, the combine 2 approaches the grain cart parking area 10 and 'collects' an empty grain cart 3, i.e. the combine driver takes control of the grain cart and induces it, preferably by remote control, to drive adjacent to or behind the combine. Preferably a grain cart that is at the beginning or end of the line of carts in area 10 is collected by the combine. In the embodiment of the figures (see FIG.

2), the cart 3 that is stationed furthest to the right is collected and controlled to drive behind the combine as the combine enters the field 1.

In step 2 of the method, the combine 2 harvests a first batch of crops by following a harvesting route 15 on the field 1. According to an embodiment, the route is pre-defined and calculated with respect to the size of the field 1, the crop type and the capacity of the combine 2 and the grain cart 3 so that the grain cart is filled up to a pre-defined degree (e.g. at least 75% full) by the time the combine reaches the end point 16 of the route 15. In the embodiment shown, the end point 16 is situated at the edge of the field 1 that is closest to the grain collecting area 7, so that the distance from the end point 16 to the crop collecting area 7 is as small as possible, and no time is lost by the combine having to cross the field with the filled cart.

In step 3 (FIG. 3), the combine/grain cart combination 2+3 drives to the grain collecting area 7, preferably via a pre-defined route 17, towards a location within the grain collecting area 7, referred to as the drop-off location 18. Preferably, the drop-off location 18 is pre-defined within the collecting area 7. On the road 8 alongside the grain collecting area 5, the truck 9 is waiting. The combine 2 releases control over the grain cart 3 when the cart is at the drop-off location 18.

In step 4, the truck driver takes control over the grain cart 3 (see FIG. 4), preferably by remote control. As soon as the truck driver has gained control over the grain cart, he or she empties the grain cart 3 into the truck 9, possibly moving the cart back and forth alongside the truck for obtaining adequate distribution of the crops in the load area of the truck. For this purpose, the grain cart 3 is preferably equipped with its own grain spout 19.

In step 5 (FIG. 5), as soon as the grain cart 3 is empty, the truck driver steers the emptied cart 3 towards the parking area 10 where the cart 3 is parked at the back of the line. In the meantime, the combine 2 has moved on towards the parking area 10 and has picked up the second empty cart 4 for its second run through the field, preferably along a second pre-defined route 20. Alternatively, the combine waits for the cart to be emptied, and then control of the empty cart is transferred back from the truck driver to the combine driver who steers the cart back to the parking area 10. After that, the method steps are repeated until all crops from the field have been harvested.

In the above-described embodiment, steps 1 to 3 represent the 'harvesting phase' of the method of claim 1, while steps 4 and 5 represent the 'delivery phase'. The control over the cart 3 executed by the drivers of the combine 2 and of the truck 9 is such that during the combined totality of the harvesting phase and the delivery phase, whoever is controlling the motion of the cart, i.e. either the combine driver or the truck driver, is physically present in the direct vicinity of the cart and thus capable of visually inspecting and supervising the cart's movement and operations. Except when the grain cart is moving behind the combine harvester, all operations of the cart, for example the unloading of the cart into the truck, are controlled whilst the cart is continuously in direct line of sight of the person who is executing that control. When the cart is moving behind the combine, a visual control by camera's and/or mirrors is ensured. In this way, the method enhances the safety of the harvesting operation, as well as ensuring that the operator of a manned vehicle is supervising the unmanned vehicle at all times.

A combine used in the method does not require grain storage capabilities and can thus be optimized in terms of its grain production capacity. In practice, this means that combines can be used with a larger threshing and cleaning arrangement without surpassing practicable size or weight limitations.

Various criteria may be applied for calculating the harvesting routes 15/20, depending on particular circumstances, such as the presence of more than one road or path (for example one on each side of the field). According to another embodiment, no pre-defined harvesting routes are determined beforehand, and the combine driver delivers the filled cart to the grain collecting area 7 regardless of the location reached in the field when the cart is full (or full to a pre-defined degree).

According to an embodiment, a transportation phase is performed between the harvesting phase and the delivery phase. In this case, instead of having the driver of the combine 2 bring the filled cart 3 to the grain collecting area 7 after completing the harvesting route 15, a tractor or any other manned vehicle capable of driving off road (jeep, quad, . . . ), driven by a third driver and capable of assuming control over the grain cart collects the filled cart at the location in the field where the combine released it and subsequently steers it towards the grain collecting area 7. This may be done systematically or only in exceptional cases when the grain cart is full before the end point 16 of the route 15 has been reached. The inclusion of the transportation phase is particularly useful when no pre-defined harvesting routes are applied, so that the location at which the grain cart is full may be far removed from the grain collecting area 7. In that case the transportation phase makes it unnecessary for the combine driver to cross the long distance from said location to the grain collecting area. When the cart is full, the third driver drives the tractor or other vehicle up to the combine harvester, takes control over the full grain cart after the combine driver has released the latter (or via a transfer protocol stated earlier), and subsequently transports the cart towards the truck 9 where control over the cart is transferred to the truck driver in the same way as described above for the transfer from combine to truck. In the same way as described for the harvesting phase and the delivery phase, the third driver is capable of visually inspecting the cart during the totality of the transportation phase. According to a preferred embodiment, the third driver drives up to the combine whilst steering an empty cart along with it so that the combine can take control of that cart and doesn't need to return to the parking area 10 before continuing on the next harvesting route.

The transfer of control over the cart 3 can take place as described above, i.e. with a period during which the cart 3 remains in the drop location 18 (or a location in the field) after being dropped off by a first driver (the combine driver or the driver of the tractor) until is collected by a second driver (the driver of the tractor or the truck driver) or the transfer could take place instantaneously as soon as the first driver releases the cart. A suitable transfer protocol may be devised according to which the first driver releases the cart only after acquiring confirmation from the second driver that the latter is ready to accept control over the cart. Transfer of the cart may take place without stopping the cart's movement.

Particular aspects of the embodiment shown in the drawings have certain advantages. Transferring the grain cart from the combine 2 (or the tractor or other off road vehicle) to the truck 9 in a dedicated grain collecting area 7 next to a road or path 8 allows the use of grain collecting vehicles that are not capable of driving in the field, such as the truck 9, so that no limit is placed on the capacity of the grain collecting vehicle (too large collecting vehicles are not capable of driving off-road). The use of a dedicated parking area 10 for empty grain carts allows to establish a rotation system of the unmanned grain carts as described above, wherein empty grain carts are picked up at one end of a line of carts and return to the line after being used in the field and emptied into the truck, at the opposite end of the line. These measures enhance the efficiency and speed of the harvesting operation. The parking area 10 and/or the grain collecting area 7 may have a fixed location with respect to the field 1, or they may be adjustable 'on the go', for example by being displaced progressively as the harvesting continues, or in dependence of the availability of suitable areas for unloading and parking the grain carts.

According to an embodiment, multiple grain carts are used simultaneously in the above described methods. For example a pair of carts may be driven alongside the combine harvester, one cart on each side of the harvester, while the harvesting takes place, filling first one cart and then the other. If a transportation phase is applied, the pair of filled carts is then steered by the operator of the tractor or other off-road vehicle towards the grain collecting area 7. Unloading of the carts into the truck during the delivery phase preferably takes place by unloading them one by one. According to an embodiment, multiple carts are moving along with the combine harvester, but as soon as one cart is full, the combine leaves it behind and continues to harvest while a second cart receives crops. The filled cart is then collected by a tractor or other off-road vehicle as described above (in a transportation phase), or it can be collected by the combine harvester itself after the latter has filled the other carts. The combine may then bring all the filled carts to the grain collecting area.

The method is applicable not only to combine harvesters but to other types of crop harvesting vehicles, such as forage harvesters. Any self-propelled unmanned vehicle known in the art that is capable of being controlled by remote control or other means is applicable in the method of the invention.

Figure 6:
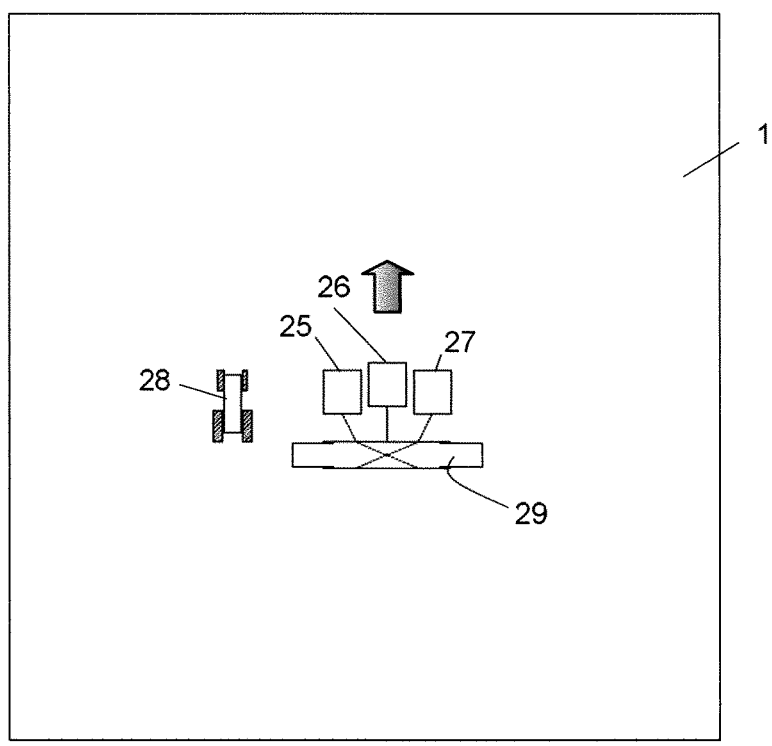
FIG. 6 illustrates a method for performing a tillage operation according the invention.

The invention is equally related to the use of unmanned vehicles as traction vehicles in an agricultural field. According to the invention, one or more unmanned vehicles are controlled, preferably by remote control, from a manned vehicle such as a tractor, the control being effectuated by the driver of the tractor. The one or more vehicles may for example be steered to follow or run alongside the tractor on a given route through a field, for the purpose of performing a tillage operation in the field. This is illustrated in FIG. 6. Three unmanned vehicles 25/26/27 are being controlled by remote control by the driver of a tractor 28. The unmanned vehicles are towing a tillage apparatus 29 through a field 1, in the direction of the arrow. Advantageously, the driver of the tractor is capable of visually inspecting the unmanned vehicles at all times during the tillage operation, preferably by a direct line-of-sight view of the unmanned vehicles. Therefore, the tractor is preferably driving alongside the unmanned vehicles so that a direct line-of-sight control is possible at all times. By adapting the number of unmanned vehicles applied in this way, the traction power can be increased or decreased in a modular way, depending on the requirements of the operation at hand. This method allows to perform any given operation without requiring heavy track-driven tractors or similar towing vehicles. It is advantageous in any of the embodiments of the invention, to use self-propelled unmanned vehicles that can be easily adapted according to a required functionality. According to an embodiment, an unmanned vehicle is used that is equipped with a removable crop storage tank. When the tank is present, the vehicle can be used in the method of FIGS. 1 to 5. When the vehicle is used as a traction vehicle, the tank may be removed.

The invention claimed is:

1. A method for collecting crops from a field by harvesting crops with a manned crop harvesting vehicle operated by a first operator and collecting said crops in a manned crop collecting vehicle operated by a second operator, wherein at least one unmanned self-propelled crop cart is used, the method comprising:
    a harvesting phase, wherein the unmanned cart is used for receiving harvested crops from the harvesting vehicle while the harvesting vehicle is in the process of harvesting; and
    a delivery phase, wherein the unmanned cart is used for delivering harvested crops received during the harvesting phase, to the crop collecting vehicle,
    wherein the unmanned cart is controlled by the first operator during the harvesting phase and by the second operator during the delivery phase, in such a way that the first and second operator are capable of visually inspecting the crop cart's operation during the totality of the harvesting and delivery phases respectively.

2. The method according to claim 1, further comprising a transportation phase between the harvesting and the delivery phases, during which transportation phase the unmanned cart is controlled by a third operator, being the operator of a manned field transport vehicle, and wherein the third operator is capable of visually inspecting the crop cart's operation during the totality of the transportation phase.

3. The method according to claim 1, wherein:
    a crop cart parking area is defined in the vicinity of the field, a plurality of empty crop carts being parked in the parking area,
    an empty cart is collected from the parking area by the first operator at the start of the harvesting phase, and
    empty carts are returned by the first or the second operator to the parking area at the end of the delivery phase.

4. The method according to claim 3, wherein the plurality of empty carts in the parking area are parked in a row, and wherein an empty cart is collected by the first operator at a front of the row, and an emptied cart is returned by the first or second operator at a back of the row.

5. The method according to any one of claim 1, wherein:
    a crop collecting area is defined in the vicinity of the field,
    a filled crop cart is deposited in said crop collecting area by the first operator at the end of the harvesting phase or by the third operator at the end of the transportation phase, and
    the second operator collects the filled cart at the location where it is deposited and empties the cart into the crop collecting vehicle.

6. The method according to claim 5, wherein the filled cart is deposited in a drop-off area that is pre-defined within the crop collecting area.

7. The method according to claim 5, wherein the crop collecting area is located adjacent a road or path, and wherein the crop collecting vehicle is a truck that is parked on said road or path while the filled cart is being emptied into the truck.

8. The method according to claim 5, wherein the harvesting vehicle harvests crops from the field by following a predefined harvesting route, while the unmanned vehicle receives harvested crops, and wherein the harvesting route is calculated so that an end point of the harvesting route is located at an edge of the field that is as close as possible to the crop collecting area.

9. The method according to claim 5, wherein a parking area and the crop collecting area are adjusted on-the-go as a sequence of the harvesting, transportation, and delivery phases are executed.

10. The method according to claim 1, wherein the at least one unmanned self-propelled crop cart is controlled by wireless remote control.

\* \* \* \* \*